(12) United States Patent
Park

(10) Patent No.: US 6,577,348 B1
(45) Date of Patent: Jun. 10, 2003

(54) APPARATUS AND METHOD FOR DIGITIZING AN ANALOG VIDEO SIGNAL

(75) Inventor: Dong Ho Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/535,965

(22) Filed: Mar. 27, 2000

(30) Foreign Application Priority Data

Mar. 27, 1999 (KR) ........................................ 1999-10683

(51) Int. Cl.[7] .................................................. H04N 5/46
(52) U.S. Cl. ........................ 348/554; 348/557; 348/441
(58) Field of Search ................................. 348/554, 555, 348/557, 558, 441; 345/603; H04N 5/46, 3/27

(56) References Cited

U.S. PATENT DOCUMENTS 5,784,113 A * 7/1998 Rhodes ........................ 348/441

6,211,918 B1 * 4/2001 Uwabata et al. ............ 348/554

* cited by examiner

*Primary Examiner*—Sherrie Hsia
(74) *Attorney, Agent, or Firm*—Birch, Stewart, Kolasch & Birch, LLP

(57) ABSTRACT

A video processing method and apparatus for displaying a signal input in an analog form in a digital TV is disclosed. The present invention eliminates an interference between signals by unifying a flow of analog video signals having different formats, and several signal formats are processed without change through a basic construction of the hardware. Also, the efficiency is increased by utilizing an ADC, a clock and a clamp pulse generation in common for signals based on different formats. Furthermore, a stable interface operation is executed by reconstructing a horizontal synchronization with a constant width in a clock base, and performing a combination and a separation of digital signals on the basis of such construction.

19 Claims, 6 Drawing Sheets

HS

SHS

VS → even field

VS → odd field

APPARATUS AND METHOD FOR DIGITIZING AN ANALOG VIDEO SIGNAL

BACKGROUND OF THE INVENTION

1. Field of the Invention

The present invention relates to a digital TV, and more particularly, to a video processing apparatus for displaying input signals of an analog type in a digital TV.

2. Discussion of Related Art

A National Television Standards Committee (NTSC) system has been used as the television (TV) transmission system for the past decades. However, with the development of a digital TV, the NTSC system and the digital TV must coexist in the future years.

Particularly, the digital TV processes and displays digital stream data based on an Advanced Television Systems Committee (ATSC) system. The digital TV is capable of simultaneously receiving data of the existing analog TV through a different channel and also supplying the PC display formats such as a Video Graphics Array (VGA).

Particularly, if the digital TV receives a NTSC signal, a synchronization signal is detected from a composite video signal demodulated through a tuner. Thereafter, a luminance element and a color signal are separated from the demodulated video signal and are digitally sampled through an analog/digital converter (ADC). The VGA is output generally in a format of RGB, and an analog RGB is digitalized through the ADC in order for a digital process.

Thus, an input signal of an ATSC or NTSC or a VGA may be displayed on digital TV screen. The NTSC and VGA are analog video signals having different resolution, namely in horizonal frequency and number of samples per scanning line. Also, unlike the VGA signal based on an RGB color space, the NTSC is constructed with a luminance signal Y and a color signal U, V, requiring a specific ADC having a clamp characteristic. Moreover, the NTSC and VGA requires a different clock as sampling frequency varies according to mutually different resolution and scanning system.

Accordingly, to process a TV video signal, the Y signal and the U, V signal must be separately clamped to different DC level, while all three RGB channels of the VGA must be clamped to a same level. That is, the method of constructing the ADC varies depending upon a signalling characteristic.

The NTSC video signal is based on an interlaced scanning system and has a horizontal frequency of 15.7 KHz which corresponds to a half of a VGA 640×480 mode of similar space resolution. The VGA signal has horizontal frequency of approximately 31.5 KHz. Thus, different sampling clocks which are proportionate to the horizontal frequency should be provided to perform a sampling resulting in information of similar horizontal resolution.

SUMMARY OF THE INVENTION

Accordingly, an object of the present invention is to solve at least the problems and disadvantages of the related art.

An object of the present invention is to provide an efficient video processing method and apparatus of a digital TV. Particularly, an object of the present invention is to decrease signal paths of video signals based on different formats and required devices.

Another object of the present invention is to provide a video processing method and apparatus of a digital TV capable of reducing a crosstalk by unifying different sampling blocks.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the video processing apparatus of a digital TV comprises a selector for receiving at least one analog video signal, said selector selecting and outputting one of the analog video signals; a clock generator for generating a single clock locked with the analog video signal selected through the selector; an ADC for digitalizing the analog video signal output from a switch synchronously to the clock; a display format converter for converting the digitalized video signal to match to a display format; and a controller for controlling the input video selection and clock generation.

In accordance with the present invention, the selector converts an RGB type signal into a Y,Cb,Cr type signal and outputs the converted signal, in case the input analog video signal is a VGA. Also, the controller reads a register value corresponding to a signal source in a predetermined table according to signal source selection information to set the clock generator, and the clock generator decides generation frequency according to the register value.

The present invention may further include a clamp pulse generator for receiving a horizontal synchronization signal through the selector, generating clamp pulse in a section between the horizontal synchronization signal and active data, and outputting the generated clamp pulse to the ADC. Moreover, the present invention may further include a field detector which detects field information in case the input analog video signal is an NTSC, and outputs it to the display format converter.

In accordance with the present invention, the video processing apparatus may further comprise a multiplexer for multiplexing a digitalized Cb,Cr color signal in response to a selection signal; a selection signal generator for generating the selection signal from a clock generated in the clock generator and a reconstructed horizontal synchronization, and providing it to the multiplexer; and a horizontal synchronization regenerator for generating pulse on the basis of a clock of the clock generator at a time point of a leading edge immediate after a horizontal synchronization output through the selector, logically combining this generated pulse with its n-clock delayed pulse, and reconstructing a horizontal synchronization.

Also, a method of processing video comprises unifying a flow of analog video signals by converting received analog video signals into a predetermined format; and utilizing one clock to process said analog signal of the predetermined format by generating said clock to correspond to said analog signal of the predetermined format.

Furthermore, in another embodiment, a method of processing video in a digital TV comprises receiving at least one analog video signal, synchronizing the received analog video signals into a predetermined format, selecting and outputting an analog video signal of said predetermined format; generating a clock locked with the analog video signal of said predetermined format; digitalizing the analog video signal of said predetermined format, in synchronization to the clock, and outputting a digitalized video signal; converting the digitalized video signal to match a display format; and controlling the selection of an analog video signal and controlling the clock generation.

BRIEF DESCRIPTION OF THE ATTACHED DRAWINGS

The invention will be described in detail with reference to the following drawings in which like reference numerals refer to like elements wherein.

Figure 1:
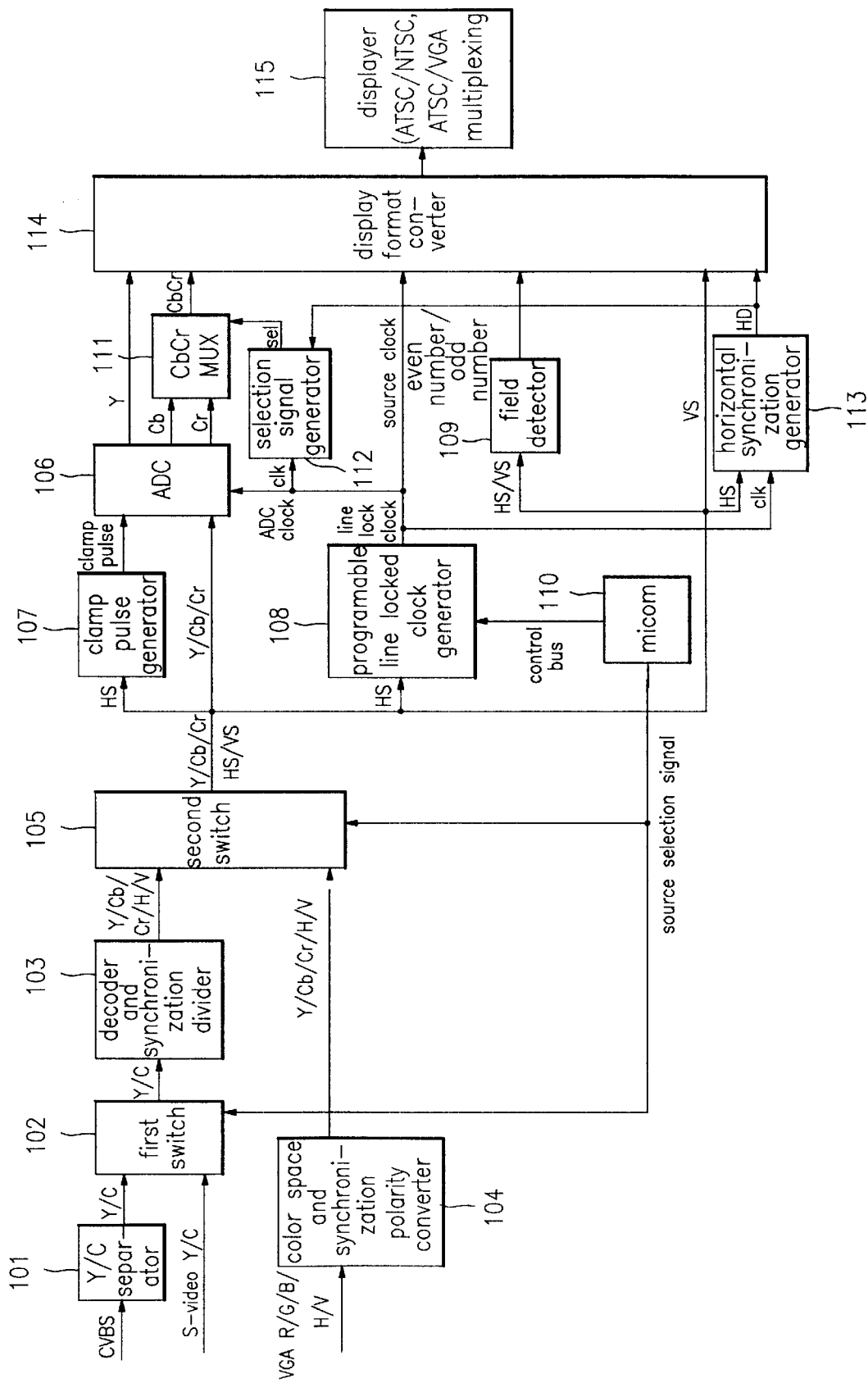
FIG. 1 is a block diagram of a video processing apparatus in a digital TV in accordance with the present invention.
Figure 2A:
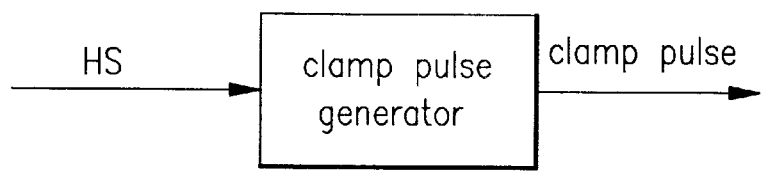
FIG. 2(a) is a block diagram of a clamp pulse generator in FIG. 1.
Figure 2B:
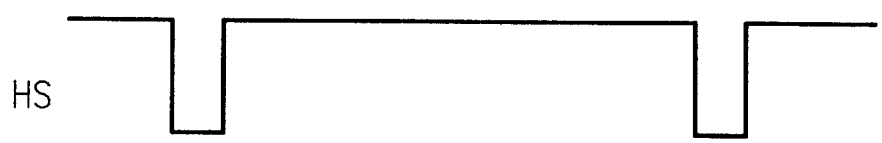
Figure 2C:
Figure 2D:
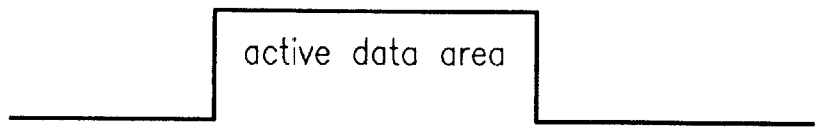
Figure 3:
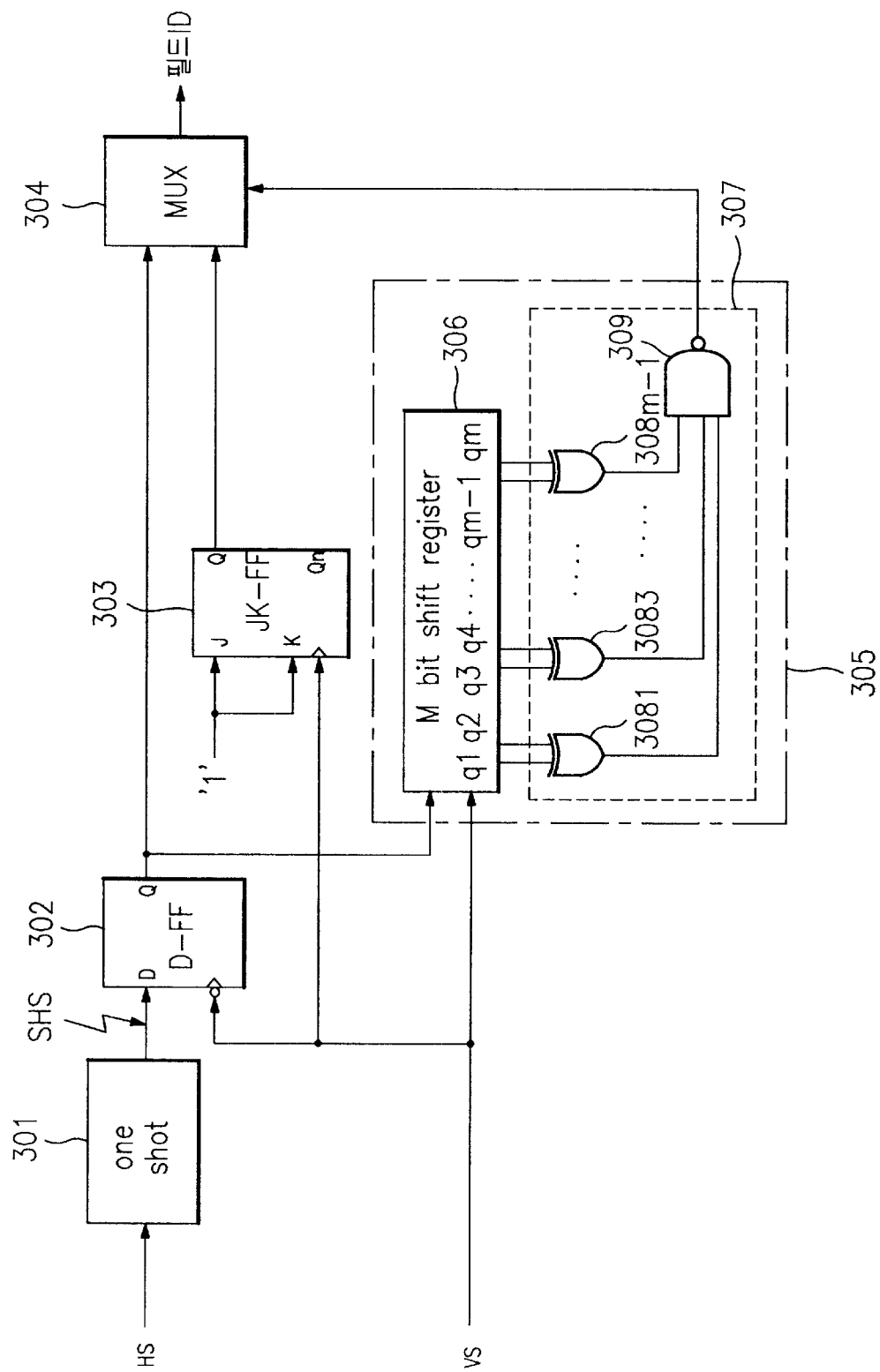
Figure 5:
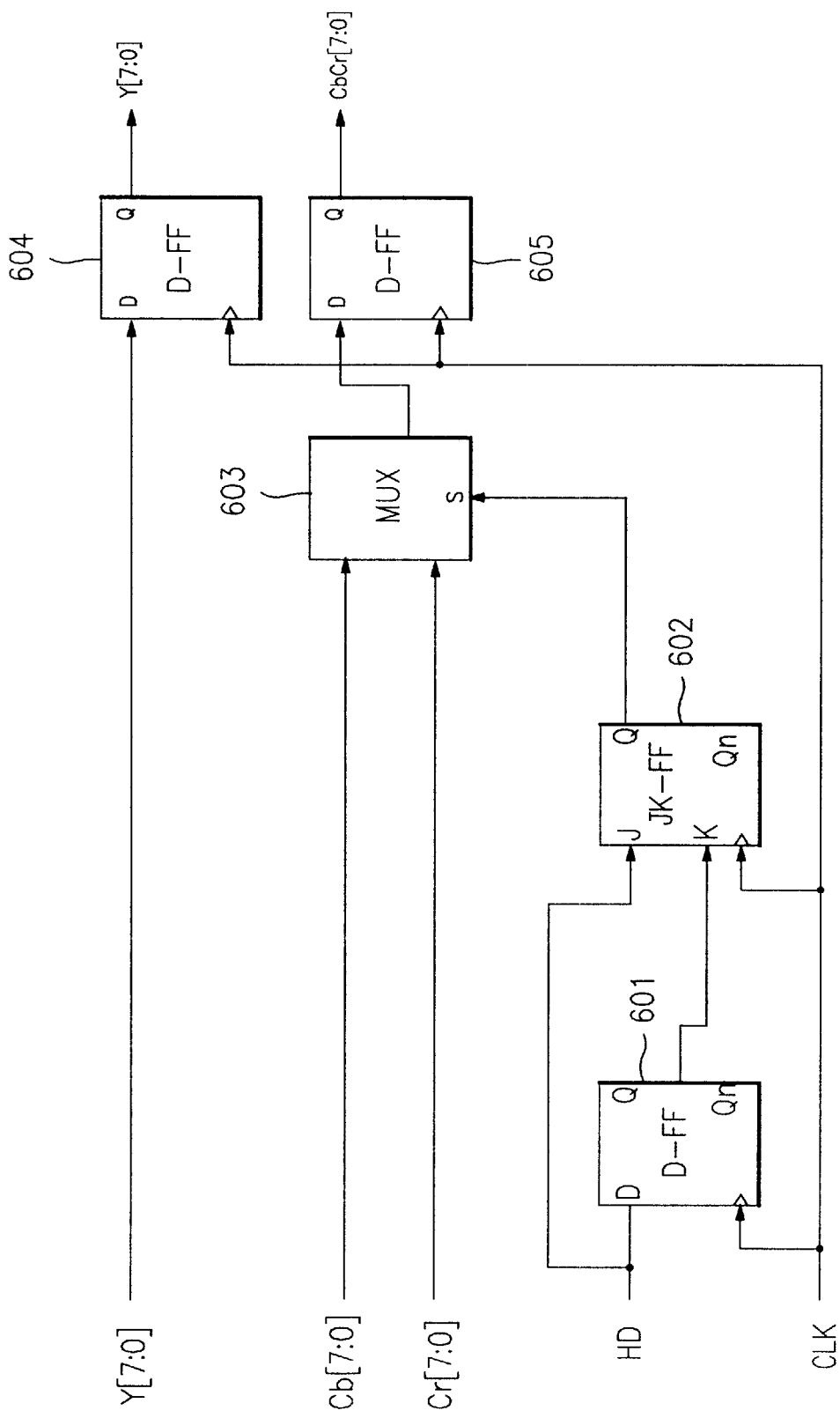
Figure 6:
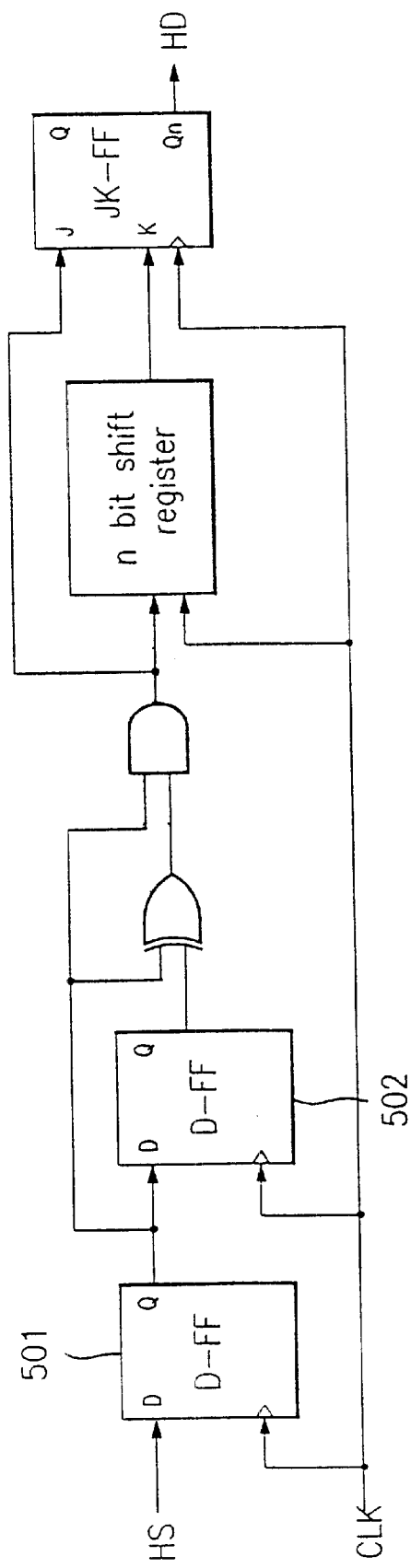

FIGS. 2(b) through 2(d) indicate input/output timing diagrams of the clamp pulse generator in FIG. 2(a);

FIG. 3 is a block diagram of a field detector in FIG. 1;

FIGS. 4(a) to 4(d) depict timing diagrams of respective parts provided in FIG. 3;

FIG. 5 is a block diagram for a CbCr multiplexer and a selection signal generator of FIG. 1; and FIG. 6 is a block diagram of a horizontal synchronization regenerator in FIG. 1.

DETAILED DESCRIPTION OF PREFERRED EMBODIMENT

Reference will now be made in detail to the preferred embodiments of the present invention, examples of which are illustrated in the accompanying drawings.

FIG. 1 is a block diagram of a video processing apparatus in accordance with the present invention. The present video processing apparatus may be implemented in a digital TV and includes a Y/C separator 101 which divides a composite video signal demodulated in a tuner or a CVBS signal input through an exterior terminal into a luminance signal Y and a color signal C; a first switch 102 which selects and outputs either the Y/C signal output from the Y/C separator or an S-video Y/C signal; a decoder and synchronization divider 103 which decodes the Y/C signal output by the first switch 102 into a base band analog Y/Cb/Cr signal, and separates horizontal and vertical synchronization signals H/V from Y signal; a color space and synchronization polarity converter 104 which converts a VGA signal input in RGB into the Y/Cb/Cr signal, and simultaneously converts an input synchronization into a same polarity as the NTSC; a second switch 105 which selects and outputs either an output of the decoder and synchronization divider 103 or an output of the color space and synchronization polarity converter 104 by switching.

Also, the present video processing apparatus includes an ADC 106 which converts the Y/Cb/Cr signal output by the second switch 105 into each digital signal; a clamp pulse generator 107 which generates clamp pulse by using a horizontal synchronization HS output by the second switch and outputs the clamp pulse to the ADC 106; a programmable line locked clock generator 108 which generates clocks matched to respective input sources; a field detector 109 which detects whether the signal is an even-numbered field or an odd-numbered field using the horizontal and vertical synchronization HS/VS output by the second switch 105; a micom 110 which controls the switching of the first and second switches 102 and 105, simultaneously reads a register value corresponding to a signal source in a predetermined table according to signal source information, and sets the programmable line locked clock generator 108 through a series control bus.

The present video processing apparatus further includes a CbCr multiplexer 111 which multiplexes and outputs a CbCr digitalized in the ADC 106; a selection signal generator 112 which generates a selection signal of the CbCr multiplexer 111 using a reconstructed horizontal synchronization HS and a clock signal; a horizontal synchronization regenerator 113 which reconstructs the horizontal synchronization HS using the horizontal synchronization HS output through the second switch 105 and a clock clk output from the programmable line locked clock generator 108; a display format converter 114 which converts the NTSC or VGA signal processed and output through the above blocks into a format which can be multiplexed with an ATSC display format; and a displayer 115 which multiplexes the NTSC or VGA signal output from the display format converter 114 with the ATSC signal, and outputs the multiplexed signal.

For purposes of explanation, the video processing apparatus may generally be divided into a NTSC input signal path and a VGA input signal path.

In the NTSC input signal path, the Y/C separator 101 divides a composite video signal demodulated in the tuner or a CVBS signal input through the exterior terminal into a luminance signal Y and a color signal C, and outputs the signals to the first switch 102. The first switch 102 selects either a S-video Y/C signal input through the exterior terminal or a Y/C signal input through the Y/C separator 101, and outputs the selected signal to the decoder and synchronization divider 103. The decoder and synchronization divider 103 decodes the selected Y/C signal based on the NTSC type into a base band analog Y/Cb/Cr signal, and divides the decoded signal into horizontal and vertical synchronization signals H and V. Thereafter, the decoder and synchronization divider 103 outputs the signals to the second switch 105.

The color space and synchronization polarity converter 104 is a block for converting a color coordinate system, namely for the VGA input signal path. Namely, the VGA signal is input in a RGB type signal and is converted into Y/Cb/Cr signals through the color space and synchronization polarity converter 104 as shown by Equation 1, wherein the RGB and Y/Cb/Cr are assumed to be data after the 8 bit ADC, i.e. having values from 0 to 255.

$Y=0.257+0.504G+0.098B+16$ $Cb=-0.148R-0.291G+0.439B+128$ $Cr=0.439R-0.368G+0.071B+128$ [Equation 1]

The color space and synchronization polarity converter 104 also unifies the input synchronization to match a polarity of the NTSC. Thus, after the second switch 105, data is processed through one process, regardless of the input signal type.

The first and second switches 102, 105 selects an input signal according to the control of the micom 110. Namely, the first switch 102 selectively outputs either the composite video signal or the S-video signal among the NTSC signals by a switching operation. Similarly, the second switch 105 selectively outputs either the NTSC signal or the VGA signal by a switching operation.

The video signal Y/Cb/Cr selected by the second switch 105 is input to the ADC 106, and is digitalized. The horizontal and vertical synchronization signals HS/VS selected by the second switch 105 are input to the clamp pulse generator 107 and the programmable line locked clock generator 108. Here, the video signal, either the NTSC or VGA, are sampled through the ADC 106 based on the same circuit construction, since all videos are in the color coordinate system of Y/Cb/Cr. Also, the ADC 106 requires a clamping function because the Y signal has a DC level of '0' while the Cb/Cr have a DC level of '128.'

The clamping is performed in a horizontal blanking section of each line in the video signal. Particularly, in the video signal containing the synchronization signal, the section following a generation of a horizontal synchronization signal, but prior to an active data is used as a clamping bottom level. At this time, the Y signal in a clamp active section is assigned a digital value of 16 in the 8 bit ADC 106, and the Cb/Cr in the clamp active section are assigned digital values of 128.

FIGS. 2a~2d show a block diagram of a clamp pulse generator 107 with input/output timing diagrams of the clamp pulse generator 107. The clamp pulse generator 107 may be implemented by a retriggerable single shot. In such case, a trigger is provided by the horizontal synchronization signal HS as shown in FIG. 2b to the single shot and a clamp pulse with an adequate width as shown in FIG. 2c is generated by controlling an RC time constant. Accordingly, the generated clamp pulse is output to the ADC 106.

In the above clamp pulse generator 107, the clamp pulse is generated in a section where the DC level is most stabilized, namely, in the section of immediately following the horizontal synchronization signal but prior to the active data as shown in FIG. 2d. By controlling the interior R/C time constant for the exterior synchronization, the retriggerable single shot may be used with the 74 series, officially announced as the IC which generates pulses having a required width.

By changing and unifying the color space prior to the ADC, a three channel ADC implemented by a clamp circuit receiving one YUV type input is simply required. Therefore, in the present invention, one type of signal is input to the ADC 106, regardless of the signal format, even when the signals having different color space such as ATSC video signal, the NTSC or the VGA signals are interfaced. Unifying the color space has more advantages with respect to price and implementation than a digital color space conversion performed after the ADC. Also, although the present embodiment converts and unifies the color space into the YUV color space, alternative embodiments may convert and unify the color space into other color spaces such as the RGB color space.

Moreover, a reference clock is required in order for the ADC 106 to digitalize an analog signal into specific sampling frequency. This sampling frequency is determined by taking into consideration the spacial resolution, a scanning system and time resolution of a signal. Namely, for a progressive scanning rather than the interlaced scanning system, the sampling frequency increases proportionately with the spacial and time resolution.

In one example, assume the NTSC signal has a field frequency of 60 Hz and a horizontal frequency of 15.7 KHz in an interlaced scanning system. Also, since the NTSC signal has a band of about 4M, the sampling frequency is determined to be around 13.5M or 14.3M according to the post application portion. In the present embodiment, the sampling frequency of the NTSC is determined to be 14.3M. Thus, the sampling frequency per scanning line results in 910 number of samples and an area of active data has the 768 number of samples. Meanwhile, the VGA is a video signal of a sequential scanning system and has a frame frequency of 60 Hz. Assuming that the number of scanning lines is 525 in a resolution of 640×480, the horizontal frequency is 31.5 KHz, the number of horizontal samples is 800, and the sample frequency is 25.175 MHz.

The two different clocks are generated in the programmable line locked clock generator 108. Particularly, the micom 110 switches the first and second switches 102, 105 and simultaneously reads a register value to set the programmable line locked clock generator 108 through a control bus. Here, the register value corresponds to a signal source from a predetermined table and the micom 110 reads the register value according to signal source selection information. Therefore, the generation frequency in the programmable line locked clock generator 108 is determined by the register values, wherein the register values are values corresponding to coefficients for converting reference frequency into desired frequency.

In the video processing apparatus, as described above, an interference by other clock source is minimized because one clock exist in the interface system when the signal source is selected. Namely, the micom 110 recognizes the source information desired by a user, from an infrared rays(IR) signal when the user enters input through a remote control source, and controls the system according to its mode.

The micom 110 discriminates the NTSC and VGA modes through the user input. If the mode is determined as the NTSC mode, the micom 110 further discriminates whether the NTSC signal is a Y/C input or a composite video signal the mode is determined as the composite video signal, a Y/C separation is performed in the Y/C separator 101.

A clock generator register is then set by a corresponding mode value from the table according to the distinct input signal. For example, the clock frequency is set to 14M for the NTSC and to 25M for the VGA. Also, through an additional allocated port, an input mode for the display format converter 114 is set such that the display format converter 114 converts the input mode into a format which can be multiplexed with the ATSC.

The display format converter 114 processes inputs of the NTSC and the VGA according to the input selection mode, and converts signals into formats which can be multiplexed with the ATSC display format. Particularly, the NTSC utilizes the interlaced scanning system. Thus, two fields of different timing form a frame and such information should be transferred to the display format converter 114. Accordingly, if there is no field information, the display format converter 114 may process one field without the other, causing an error. As a result, the present invention may implement the field detector 109 to determine whether the input data is an odd or even number field of the input image and to output such field information to the display format converter 114.

Although any field detector may be implemented in the present invention, FIG. 3 shows a block diagram of a field detector 109 according to the preferred embodiment of the present invention. The present field detector 109 is constructed by a retriggerable single one shot 301, a D flip-flop 302, a JK flip-flop 303, a multiplexer 304, and a selection controller 305.

Generally, the field information in the NTSC may be determined based upon a correlation between the horizontal synchronization HS and the vertical synchronization VS. Namely, a determination whether the input data is an even or odd field is made according to the position of the horizontal synchronization HS at a time point when the vertical synchronization VS falls to '0.' However, there are cases when the field information cannot be obtained from a relation between the horizontal and vertical synchronization.

For example, the field information cannot be determined from the horizontal and vertical synchronization during a playback of a digital multi-function disk (DVD) in the digital NTSC mode, during a trick mode in a VTR, and during a blue back on-screen display (OSD) in a playback of the VTR. In such cases, the even field and the odd field are not input alternately, rather the input is irregular. Therefore, the field information must be obtained forcefully. In other words, when the fields are irregularly input, detecting the field information from the relation between the horizontal and vertical synchronization can cause an error.

Figure 4A:
Figure 4B:
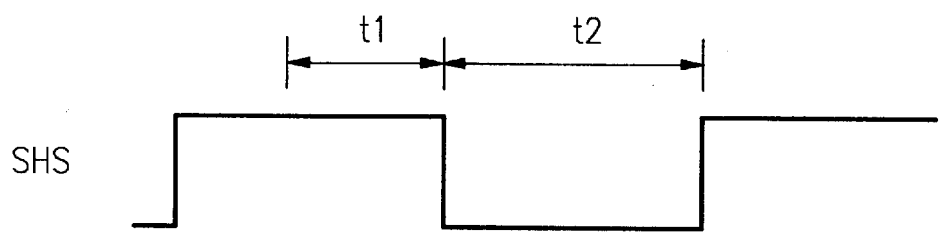

Therefore, in the present field detector 109, the width of the horizontal synchronization HS as shown in FIG. 4a is expanded as shown in FIG. 4b by the single shot 301. As a result, the phase is varied, resulting in an easier determination of even or odd fields through the horizontal synchronization. Particularly, the starting point of the horizontal starting point is delayed by t1, as shown in FIG. 4b, using a signal one shot of a low time constant in a synchronization phase variance to trigger the leading edge of the horizontal synchronization.

A second single one shot is then used to trigger the trailing edge of the a first signal output to extend the low edge of the synchronization by t2. In the preferred embodiment, the value of t2 is set such that a duty ratio of the horizontal synchronization reaches 50%. The closer the duty ratio is to 50%, the less the field decision error ratio of the D flip-flop would be. Thus, a more accurate field information for t he interlaced scanning system would be input to the display format converter 114.

Figure 4C:
Figure 4D:

The field decision, i.e. a determination whether the field is odd or even, is made by the D flip-flop 302 at the trailing edge of the vertical synchronization. Such decision is performed by the D flip-flop 302 based upon the output signal of the one shot 301. For example, if the vertical synchronization falls to value of '0' at a high portion of the horizontal synchronization, as shown in FIG. 4c, the input is de termined as an even field. On the other hand, if the vertical synchronization falls to a value of '0' at a low portion of the horizontal synchronization, as shown in FIG. 4d, the input is determined as an odd field.

Also , the JK flip-flop 303 is triggered by the vertical synchronization VS regardless of the horizon synchronization HS to forcefully generate the field information. Particularly, the JK flip-flop 303 maintains its state as is if both the JK inputs are '0.' If the JK inputs are all '1,' the JK flip-flop 303 reverses the previous state, i.e. the JK flip-flop 303 is triggered. Also, if the JK input is '10,' the JK flip-flop 303 is set regardless of the previous state, and if the JK input is '01,' the JK flip-flop 303 is reset regardless of the previous state. The JK flip-flop 303 automatically generates the field information through the operation as described above in case the field information cannot be determined from a relation between the horizontal and vertical synchronization.

Thus, the field information output from either the D flip-flop 302 or the JK flip-flop 303 is input to the display format converter 114 through the multiplexer 304. The multiplexer 304 selects the normal field information from the D flip-flop 302 or the forced field information from the JK flip-flop 303 in response to a selection signal. The multiplexer 304 then outputs the selected field information to the display format converter 114.

The selection signal is output by the selection controller 305. Namely, the selection controller 305 outputs a selection signal to select the output of the JK flip-flop 303 when the field decision is not stabilized using the horizontal and vertical synchronization during 'm' number of fields. However, if the field decision is stable during 'm' number of fields, the selection controller 305 outputs a selection signal to select the output of the D flip-flop 302.

Particularly, the selection controller 305 is constructed by an M bit shift register 306 and a field abnormality detector 307. The M bit shift register 306 sequentially performs M bit shifts of the output from the D flip-flop 302, i.e. the field information detected as the normal decision mode. The field abnormality detector 307 then determines if an irregularity exists in the field signal during 'm' number of fields by an exclusive OR ring of two adjacent fields using exclusive OR gates 3081, 3083, . . . , 308m−1.

In other words, the state of the field signal is regular, the two adjacent fields would be odd/even or even/odd fields and an exclusive OR ring result of two adjacent fields may be set, for example, to '1.' In an irregular state of the field signal, the two adjacent fields would be even/even or odd/odd fields and the result may be set, for example, to '0.' Therefore, the exclusive OR ring results of two fields are output to a NAND gate 309. The NAND gate 309 outputs a value of '0' when the exclusive OR ring results of two fields are all '1,' and outputs '1' otherwise. Accordingly, the output of the NAND gate 309 can be used as the selection signal of the multiplexer 304.

Furthermore, referring back to FIG. 1, the Y signal digitalized in the ADC 106 is input to the display format converter 114 as is, while the Cb, Cr signals may be multiplexed through the multiplexer 111 and input to the display format converter 114. Although the color signals may also be input directly to the display format converter 114, in the preferred embodiment, the color signals are first multiplexed because the resolution of the color signal is smaller by around half when compared to the luminance signal. At this time, the selection signal of the multiplexer 111 is provided from the selection signal generator 112. Namely, the selection signal generator 112 generates the selection signals using the clock clk generated in the programmable line locked clock generator 108 and the horizontal synchronization HD reconstructed in the horizontal synchronization regenerator 113.

FIG. 5 shows a block diagram of the CbCr multiplexer 111 and the selection signal generator 112. Generally, a D flip-flop 601 and a JK flip-flop 602 produce a stable selection signal output to the CbCr multiplexer 111, according to the clock clk. Such clock clk does not have jittering with respect to HS and the horizontal synchronization HD reconstructed by the horizontal synchronization regenerator 113. Also, the selection signal has half the frequency of the clock when the input signal format is 4:2:2. A multiplexer 603 then stably multiplexes the Cb and Cr signals according to the selection signal, and outputs the multiplexed color signal to the display format converter 114 through a D flip-flop 605. Thus, the display format converter 114 can stably demultiplex the data through HD and the clock.

The horizontal synchronization regenerator 113 may change the order of Cb and Cr during the demultiplexing of the Cb and Cr signals in the display format converter 114, if the horizontal synchronization is unstable. In order to prevent a changing of the order, the horizontal synchronization regenerator 113 receives the horizontal synchronization HS and the clock clk to reconstruct the stabilized horizontal synchronization HD. FIG. 6 show a block diagram of the horizontal synchronization regenerator 113 is shown in FIG. 5.

The horizontal synchronization regenerator 113 includes a D flip-flop 501 which produces a pulse based upon the clock clk at a point in time immediately after the leading edge of the input horizontal synchronization HS, and the produced pulse is logically combined with a pulse delayed by an 'n' clocks in a D. flip-flop 502, to reconstruct the horizontal synchronization HD. Such horizontal synchronization HD serves as the reference horizontal synchronization which has a constant width of n times a clock cycle and does not have jittering with respect to the clock.

Finally, when digitally determining the field decision, a sample clock rather than a one shop is utilized. Also, a square wave with a duty ratio of 50% is generated using a counter loaded initially by the horizontal synchronization or a counter cleared, and a determination whether the input data is even or odd can be made according to a high or low state at the trailing edge of the vertical synchronization.

As described above, in accordance with the present invention, in order to apply the ATSC, the ATSC and the NTSC, and the ATSC and the VGA, namely signals based on mutually different formats such as for a Picture In Picture and a double window, in a digital TV, a flow of signals beyond the ATSC is unified. Thus, the digital TV is significantly simplified in construction of the hardware such as an ADC, a clock generation, a switch control etc.

Furthermore, an interference such as a crosstalk caused in a concurrent process between mutually different inputs is eliminated, since there exists only one signal flow and clock according to the mode within the system. Moreover, the clock can be varied through a register set by a micom, thereby deal with several digital formats without a specific hardware construction. That is, the number of NTSC samples is variable and changeable to 768,720,704, for example.

In addition, the invention is applicable directly to a digital TV, not only in an ATSC broadcasting reception field but also in a multimedia field, to thereby gain a considerable effect in applying video formats provided in various kinds of multimedia instruments without difficulty.

In the present video processing method and apparatus, an interference between signals is eliminated by unifying a flow of video signals having mutually different formats, and several signal formats can be processed without change by a basic hardware construction. Particularly, the hardware construction is simplified by reducing signal paths and desired devices, and the interference among different signals can be removed utilizing one corresponding clock operated by a signal source selection.

Also, the efficiency is increased by utilizing an ADC, a clock and a clamp pulse generation in common for signals based on mutually different formats, and a stable interface operation is executed by reconstructing a horizontal synchronization with a constant width in a clock base, and performing a combination and a separation of digital signals on the basis of such construction. Finally, the field information is automatically generated for cases such as when there is no field information in the midst of an interfield interpolation, and when the field information is again provided, the field information is produced in a normal field mode. Therefore, a stabilized field information is provided and especially interfield interpolation can be stably operated in a blue back OSD mode in a VTR playback.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video processing apparatus of a digital TV comprising:
    a selector which receives at least one analog video signal, synchronizes the received analog video signals into a predetermined format, selects and outputs an analog video signal of said predetermined format;
    a clock generator which generates a clock locked with the analog video signal of said predetermined format;
    an ADC which receives and digitalizes the analog video signal of said predetermined format, in synchronization to the clock, and outputs a digitalized video signal;
    a display format converter which converts the digitalized video signal to match a display format; and
    a controller which controls the selection of an analog video signal in the selector and controls said clock generation in the clock generator.

2. An apparatus of claim 1, wherein the predetermined format is a Y,Cb,Cr format.

3. An apparatus of claim 1, wherein said selector converts a polarity of a synchronization signal into a polarity of an NTSC if the received analog video signal is a VGA.

4. An apparatus of claim 1, further comprising a clamp pulse generator which receives a horizontal synchronization signal through said selector, generates a clamp pulse at a section following a generation of said horizontal synchronization signal, but prior to an active data; said clamp pulse generator outputting the generated clamp pulse to the ADC.

5. An apparatus of claim 4, wherein the clamp pulse generator is implemented by a retriggerable single shot, wherein a trigger is provided by said horizontal synchronization signal and a clamp pulse with an adequate width is generated by controlling an RC time constant.

6. An apparatus of claim 1, wherein said controller reads a register value corresponding to a signal source in a predetermined table to control said clock generation, wherein said register value is read according to the analog video signal selected by the selector.

7. An apparatus of claim 1, further comprising a field detector which obtains field information when the input analog video signal is NTSC, and outputs the field information to the display format converter.

8. An apparatus of claim 7, wherein said field detector comprises:
    a normal field detector which detects the field information from a relation between a horizontal and a vertical synchronization output from said selector;
    an abnormal field detector which forcefully generates the field information from the vertical synchronization output from said selector;
    a multiplexer which selects a field information from either the normal field detector or the abnormal field detector according to a selection signal, and outputs the selected field information to said display format converter; and
    a selection controller which outputs said selection signal based upon whether said field information from the normal field detector is stable.

9. An apparatus of claim 8, wherein said normal field detector detects the field information by delaying the starting point of the horizontal synchronization starting point using a first signal one shot of a low time constant in a synchronization phase variance to trigger the leading edge of the horizontal synchronization, and by extending the low edge of the horizontal synchronization using a second single one shot to trigger the trailing edge of a first signal output.

10. An apparatus of claim 1, further comprising:
    a multiplexer which multiplexes digitalized Cb and Cr color signals from the ADC in response to a selection signal;
    a horizontal synchronization regenerator which generates a pulse based upon said clock at a point in time immediately after a leading edge of a horizontal synchronization from said selector, logically combines the generated pulse with n-clock delayed pulses, and generates a reconstructed horizontal synchronization; and a selection signal generator which generates the selection signal according to said clock and the reconstructed horizontal synchronization, and outputs the selection signal to the multiplexer.

11. A method of processing video in a digital TV comprising:

(a1) receiving at least one analog video signal, synchronizing the received analog video signals into a predetermined format, selecting and outputting an analog video signal of said predetermined format;

(b1) generating a clock locked with the analog video signal of said predetermined format;

(c1) digitalizing the analog video signal of said predetermined format, in synchronization to the clock, and outputting a digitalized video signal;

(d1) converting the digitalized video signal to match a display format; and (e1) controlling the selection of an analog video signal in (a1) and controlling said clock generation (b1).

12. A method of claim 11, wherein the predetermined format is a Y,CB,CR format.

13. A method of claim 11, wherein in (a1) converting a polarity of a synchronization signal into a polarity of an NTSC if the received analog video signal is a VGA.

14. A method of claim 11, further comprising generating a clamp pulse at a section following a generation of a horizontal synchronization signal, but prior to an active data, and outputting the generated clamp pulse to be used in (c1).

15. A method of claim 11, wherein in (e1), reading a register value corresponding to a signal source in a predetermined table to control said clock generation, according to the analog video signal selected by the selector.

16. A method of claim 11, further comprising obtaining field information when the input analog video signal is NTSC, and outputting the field information to the display format converter.

17. A method of claim 16, wherein obtaining the field information comprises:

(a2) detecting the field information from a relation between a horizontal and a vertical synchronization;

(b2) forcefully generating the field information from the vertical synchronization;

(c2) selecting a field information from either (a2) or (b2) according to a selection signal, and outputting the selected field information to be used in (d1); and (d2) generating said selection signal based upon whether said field information from the normal field detector is stable.

18. A method of claim 17, wherein in (a2), detecting the field information by delaying the starting point of the horizontal synchronization starting point using a first signal one shot of a low time constant in a synchronization phase variance to trigger the leading edge of the horizontal synchronization, and by extending the low edge of the horizontal synchronization using a second single one shot to trigger the trailing edge of a first signal output.

19. A method of claim 11, further comprising:

multiplexing Cb and Cr color signals digitalized in (c1) in response to a selection signal;

generating a pulse based upon said clock at a point in time immediately after a leading edge of a horizontal synchronization from said selector, logically combining the generated pulse with n-clock delayed pulses, and generating a reconstructed horizontal synchronization; and generating the selection signal according to said clock and the reconstructed horizontal synchronization.

* * * * *